(12) United States Patent
Williams

(10) Patent No.: US 11,465,375 B2
(45) Date of Patent: Oct. 11, 2022

(54) NANOCOMPOSITE REFRACTIVE INDEX GRADIENT VARIABLE FOCUS OPTIC

(71) Applicant: Vadient Optics, LLC., Beaverton, OR (US)

(72) Inventor: George Williams, Portland, OR (US)

(73) Assignee: VADIENT OPTICS, LLC, Beaverton, OR (US)

( * ) Notice: Subject to any disclaimer, the term of this patent is extended or adjusted under 35 U.S.C. 154(b) by 461 days.

(21) Appl. No.: 14/970,378

(22) Filed: Dec. 15, 2015

(65) Prior Publication Data
US 2017/0168272 A1 Jun. 15, 2017

(51) Int. Cl.
| | |
|---|---|
| *G02B 3/00* | (2006.01) |
| *G02B 1/04* | (2006.01) |
| *B29D 11/00* | (2006.01) |
| B82Y 20/00 | (2011.01) |
| B29K 21/00 | (2006.01) |

(52) U.S. Cl.
CPC .. *B29D 11/00403* (2013.01); *B29D 11/00355* (2013.01); *G02B 1/041* (2013.01); *G02B 3/0081* (2013.01); *G02B 3/0087* (2013.01); B29K 2021/00 (2013.01); B82Y 20/00 (2013.01)

(58) Field of Classification Search
CPC ................................................... G02B 3/0087
USPC .................................................. 359/625–654
See application file for complete search history.

(56) References Cited

U.S. PATENT DOCUMENTS

| | | | | |
|---|---|---|---|---|
| 3,305,294 A | * | 2/1967 | Alvarez ................. | G02C 7/081 359/708 |
| 3,507,565 A | * | 4/1970 | Alvarez ............... | G02B 3/0081 359/708 |
| 3,632,696 A | * | 1/1972 | Jones ................... | G02B 3/0081 264/219 |
| 4,848,882 A | * | 7/1989 | Suzuki .................. | G02B 6/425 385/33 |
| 5,315,435 A | * | 5/1994 | Horiuchi .............. | G02B 27/646 359/554 |

(Continued)

FOREIGN PATENT DOCUMENTS

| | | |
|---|---|---|
| EP | 2412767 A1 | 2/2012 |
| EP | 2474404 A1 | 7/2012 |

(Continued)

OTHER PUBLICATIONS

Richard Chartoff, et al., Functionally Graded Polymer Matrix Nano-Composites by Solid Freeform Fabrciation: A Preliminary Report, Solid Freeform (SFF) symposium, [online], 2003, pp. 385-391, [retrieved on Apr. 23, 2015]. from the Internet: <http://sffsymposium.engr.utexas.edu/Manuscripts/2003/2003-36-Chartoff.pdf>.

(Continued)

*Primary Examiner* — Zachary W Wilkes
(74) *Attorney, Agent, or Firm* — Alleman Hall Creasman & Tuttle LLP

(57) ABSTRACT

A nanocomposite-ink refractive gradient optic with variable focus optic comprising a first optical-element, a second optical-element, each the optical-elements comprised of a cured nanocomposite-ink wherein the first and second optical-element have a cubic volumetric gradient complex optical index such that when arranged in tandem along an optical axis the optical power varies based on linear translation with respect to another.

11 Claims, 5 Drawing Sheets

(56) References Cited

U.S. PATENT DOCUMENTS

| | | | | |
|---|---|---|---|---|
| 5,617,252 A * | 4/1997 | Manhart | ............... | G02B 3/0087 359/653 |
| 5,689,374 A * | 11/1997 | Xu | ................ | G02B 3/0087 359/652 |
| 6,096,155 A * | 8/2000 | Harden | ................ | G02B 6/4232 156/250 |
| 6,236,493 B1 * | 5/2001 | Schmidt | ................... | G02B 1/04 359/290 |
| 6,728,456 B1 * | 4/2004 | Aylward | ............... | G02B 6/1221 385/127 |
| 7,002,754 B2 * | 2/2006 | Baer | .................... | G02B 3/0087 359/653 |
| 7,473,721 B2 * | 1/2009 | Harada | ................ | C09D 183/06 523/210 |
| 8,593,741 B2 * | 11/2013 | Ishihara | ................ | G02B 1/041 359/652 |
| 8,840,746 B2 * | 9/2014 | Kanade | ................ | G02B 6/0065 362/628 |
| 9,091,839 B2 * | 7/2015 | Zhou | ........................ | B81B 5/00 |
| 9,238,577 B2 * | 1/2016 | Suleski | ................ | G02B 27/095 |
| 9,335,446 B2 * | 5/2016 | Crosby | ................ | G02B 3/0081 |
| 9,340,446 B1 * | 5/2016 | Baleine | ................ | G02B 3/0087 |
| 2015/0009583 A1 * | 1/2015 | Suleski | .................... | B81B 5/00 359/717 |
| 2015/0021528 A1 | 1/2015 | Chartoff | | |
| 2015/0023643 A1 * | 1/2015 | Chartoff | ............... | C09D 11/101 385/124 |

FOREIGN PATENT DOCUMENTS

| | | | |
|---|---|---|---|
| EP | 2469309 B1 | 8/2013 | |
| EP | 2392473 B1 | 9/2013 | |
| WO | WO-2014179780 A1 * | 11/2014 | ............... C08K 3/22 |

OTHER PUBLICATIONS

Barbera, Sergio, The Alvarez and Lohmann refractive lenses revisited, May 25, 2009 / vol. 17, No. 11/ Optics Express 9376.

* cited by examiner

NANOCOMPOSITE REFRACTIVE INDEX GRADIENT VARIABLE FOCUS OPTIC

TECHNICAL FIELD OF THE DISCLOSURE

The present disclosure relates in general to refractive optics. This application relates in particular to nanocomposite gradient optical index variable focus optics.

DISCUSSION OF BACKGROUND ART

A zoom optic or variable-focus optic has an effective focal length or power that can be manipulated to change magnification. The most prevalent type of zoom lens comprise a grouping of optical elements situated along an optical axis wherein change in effective focal length is accomplished by movement of one or more of the optical elements along the optical axis. Other systems include optical-elements wherein surface curvature or shape can be altered mechanically or by some other stimulus. This disclosure relates to another approach.

SUMMARY OF THE DISCLOSURE

The present disclosure is directed to a nanocomposite refractive gradient variable focus optic. In one aspect the nanocomposite-ink refractive gradient optic with variable focus optic comprising a first optical-element, a second optical-element, each the optical-elements comprised of a cured nanocomposite-ink wherein the first and second optical-element have a cubic volumetric gradient refractive-index such that when arranged in tandem along an optical axis the optical power varies based on linear translation with respect to another.

BRIEF DESCRIPTION OF THE DRAWINGS

The accompanying drawings, which are incorporated in and constitute a part of the specification, schematically illustrate preferred embodiments of the present disclosure, and together with the general description given above and the detailed description of preferred methods and embodiment given below, serve to explain principles of the present disclosure.

DETAILED DESCRIPTION

Figure 1A:
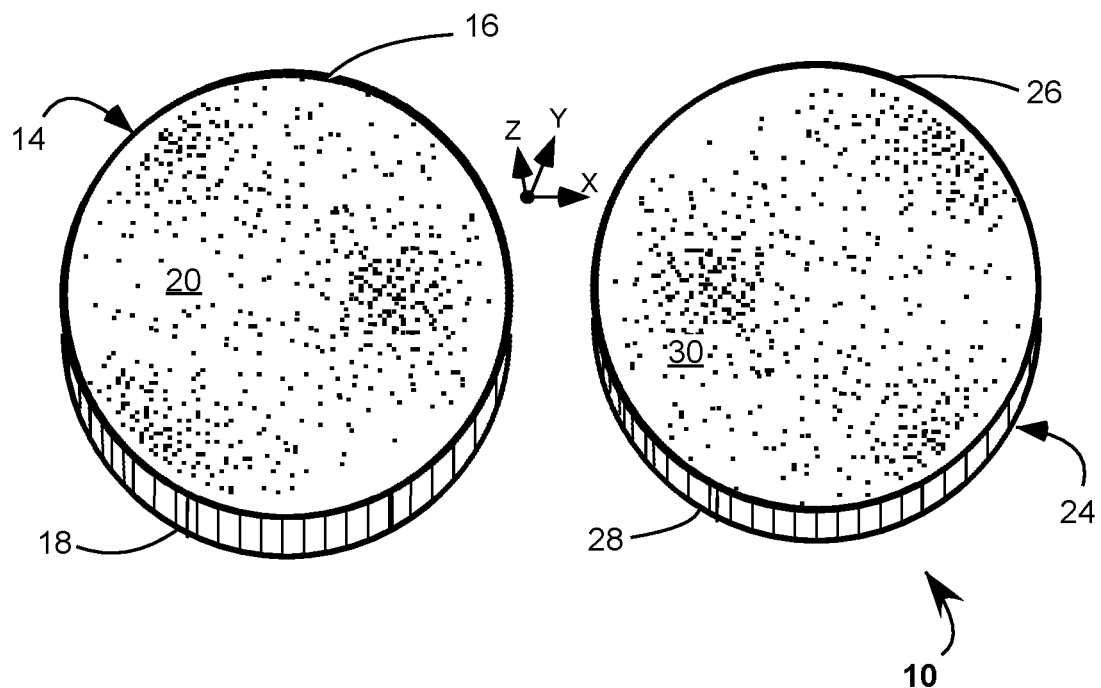
FIG. 1A is a perspective view illustrating a nanocomposite-ink gradient refractive-index with variable focus optic comprising a first optical-element, a second optical-element, each the optical-elements comprised of a cured nanocomposite-ink wherein the first and second optical-element have a cubic volumetric gradient refractive-index such that when arranged in tandem along an optical axis the optical power varies based on linear translation with respect to another.

Referring now to the drawings, wherein like components are designated by like reference numerals. Figures are characterized by mutually perpendicular axis in Cartesian coordinates allow other coordinate systems can be used. Methods of manufacture and various embodiments of the present disclosure are described further hereinbelow.

Figure 1B:
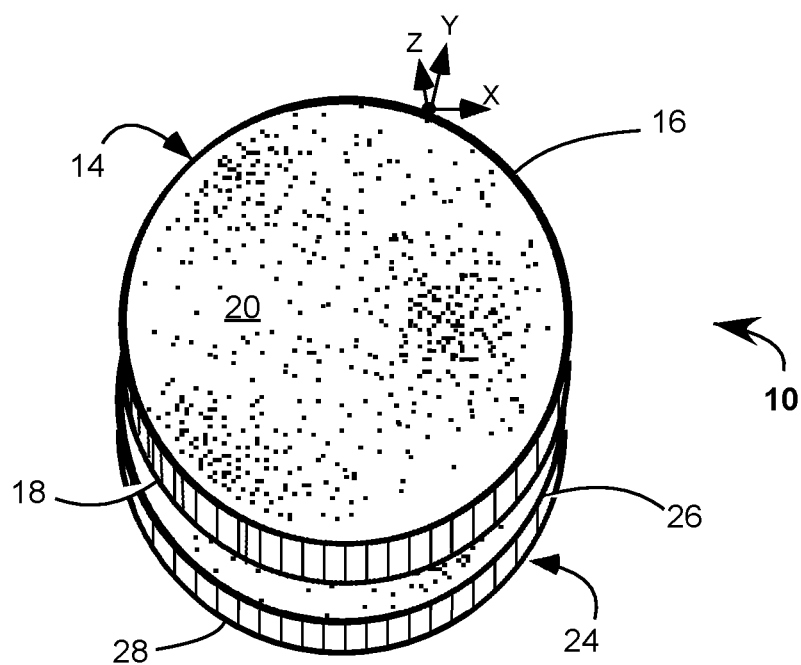
FIG. 1B is a perspective view of the variable focus optic shown in FIG. 1A wherein the first optical-element and the second optical-element are tandemly arranged.

Referring to FIG. 1A and FIG. 1B, a nanocomposite-ink gradient refractive-index optic with variable focus optic 10, also referred herein as variable focus optic, comprises two optical-elements. The optical-elements are normally situated in tandem arrangement as that shown in FIG. 1B, drawn side-by-side for illustrative purposes in FIG. 1A. Variable focus optic 10 has a first optic-element 14 with a first surface 16, a second surface 18, and a cured nanocomposite-ink 20 within and a second optic-element 24 with a first surface 26 and a second surface 28 and a cured nanocomposite-ink 30 are aligned in tandem on an optical axis 19. Here, the first and the second surface of each of the optical-elements are planar, although the surfaces can be figured into any curvature including symmetric positive, symmetric negative, cylindrical, and freeform shapes. The cured nanocomposite-ink comprises of an organic-matrix with a nanoparticle dispersed within.

The cubic volumetric gradient refractive-index is achieved by depositing and curing one or more types of the nanocomposite-inks. The optical properties of the organic-matrix, the nanoparticles, and the nanoparticle concentration determine the refractive-index in any particular area. The cured nanocomposite-inks comprising the nanoparticles dispersed within the organic matrix can be composed of various materials. The organic-matrix of the nanocomposite-ink is a curable resin optically transmissive for those wavelengths of the optical-elements intended use. Within the present disclosure, nanocomposite-inks can also include the organic-matrix without nanoparticles, also referred to as neat organic-matrix. The organic-matrix can be cured by photo exposure, thermal processes chemical process, and combinations thereof. Non-limiting examples of organic-matrix materials include polyacrylate, hexanediol diacrylate (HDODA), polymethyl methacrylate (PMMA), diethylene glycol diacrylate (DEGDA), neopentyl glycol diacrylate (NPGDA), tricydodecane dimethanol diacrylate (TCDDMDA), bisphenol A novolcepoxy dissolved in organic solvent (SU-8), and other such materials.

The nanoparticles dispersed within the organic-matrix can be any material or nanostructure that is sufficiently small, for those wavelengths of the optical-element's intended for use, not to scatter light. The nanoparticles can comprise one or more metal, dielectric, semiconductor, or organic materials. Nonlimiting examples of nanoparticles include beryllium oxide (BeO), barium titinate ($BaTiO_3$), aluminum nitride (AlO), silicon carbide (SiC), zinc oxide (ZnO), silicon dioxide ($SiO^2$), hollow silicon dioxide nanospheres (hollow $SiO^2$) zinc sulfide (ZnS), zirconium oxide (ZrO), yttrium orthovanadate ($YVO_4$), titanium oxide ($TiO_2$), copper sulfide ($CuS_2$), cadmium selenide (CdSe), lead sulfide (PbS), tellurium oxide ($TeO_2$), magnesium Oxide (MgO), Aluminum nitride (AlN), LaF3, GaSbO, nano-Diamond, $ThF_4$, $HfO_2$—$Y_2O_3$, $Yb_2O_3$, $Dy_2O_3$, $ZrO_2$—$Y_2O_3$, $Si_3N_4$, $Y_2O_3$, KBr, $Ta_2O_5$, $HfO_2$, AlGaP, SiGe, GaAs, Au, LiF, and molybdenum disulfide ($MoS_2$) including those with core, core-shell, core-shell-ligand, and hollow architectures.

The nanocomposite-inks can be formulated by the nanoparticles type or type, the organic-matrix, organic-matrix type, concentration of nanoparticles, and combinations thereof. The refractive-index of the nanocomposite-inks is influenced by the formulation. An approximation of the optical properties can be calculated based on the linear summation of the optical properties calculated for the proportionate volume percentage of the organic-matrix materials and the optical properties calculated for the volume percentage of the nanoparticles, although direct measurement is a preferred method of determining the refractive index for any given nanocomposite-ink formation. For a nanocomposite-ink with one nanoparticle type, the refractive index is given by the following equation:

$$n_{eff}(\lambda) = V\%_{NP} \times n_{NP}(\lambda) + V\%_{OM} \times n_{OM}(\lambda),$$

where $n_{eff}(\lambda)$ is the effective index of the nanocomposite-ink, $V\%_{NP}$ is the percent volume of the nanoparticles $n_{NP}(\lambda)$ is the refractive-index of the nanoparticles, $V\%_{OM}$ is the percent volume of the organic-matrix, and $n_{OM}(\lambda)$ is the refractive-index of the organic-matrix. Additional nanoparticles types can be added and percent volume and refractive-index included in the equation. For instance, nanocomposite-ink with nanoparticles that have a high-index relative to the organic-matrix will have a refractive-index that increases in proportion to the volume of nanoparticles relative to that matrix host material increases. Likewise, a nanocomposite-ink with a low-index nanoparticle, for instance a hollow Buckminsterfullerene or a hollow nanosphere, comprised mostly of air, which has an optical refractive index (n) of n=1, results in a nanocomposite-ink with a refractive index lower than the organic-matrix, which decreases closer to n=1 as the percentage of nanoparticles in the composition increases.

Using one or more of nanocomposite inks, each formulated with different compositions, the deposition of droplets of various nanocomposite-inks, allows solids with volumetrically varying complex dielectric functions to be fabricated, with allows the materials to exhibit first- and higher-order complex optical properties. These properties can include the index of refraction, third-order susceptibility, or other nonlinear optical effects. One method of manufacturing the optical-element of the present disclosure is inkjet printing, described in detail further below.

Inkjet printing the nanocomposite-ink allows materials with complex optical effects to be formed that can vary throughout their volume. These effects include the first order complex refractive index and higher order nonlinear effects such as the real and imaginary parts of the third-order susceptibility and the nonlinear refractive index and absorption coefficients.

To manufacture a volumetric gradient refractive-index at least two of the nanocomposite-inks must be used, although additional optical inks, including optical inks without nanoparticles. These inks can be printed individually, or can be mixed during the printing process to yield optical properties that differ from that of the droplets themselves. One of the nanocomposite-inks printed must have an optical index at least as low as that required by the gradient optical profile and the other nanocomposite-ink must have an optical index as least as high as the highest required by the gradient optical index profile. Intermediate values can be obtained by controlled deposition techniques including nanoparticle diffusion control and advective mixing. Such printing apparatus and printing techniques are described in U.S. patent application Ser. No. 14/863,297, assigned to the assignee of the present invention, and hereby incorporated by reference in its entirety.

One method of manufacturing the nanocomposite-ink gradient complex optical index solid includes the steps of having or providing a nanocomposite-ink printing apparatus with a nanocomposite-ink comprising of an organic-matrix with a nanoparticle dispersed within. Depositing and forming a first optic-element having a first surface and a second surface with a cubic volumetric gradient optical index. Depositing and forming a second optic-element having a first and a second surface with a cubic volumetric gradient refractive-index.

The variable focus optic can be printed separately as shown in FIG. 1A or in tandem arrangement as shown in FIG. 1B. The printing process can include additional process steps and features. For instance additional optical-elements, alignment features and sacrificial areas can be printed. Alignment features can be deposited within the optical-elements, on surfaces, and combinations thereof. For instance alignment features can be printed to aid in rotational alignment, inform post-process surface figuring, and as a guide for cleaving.

First optical-element 14 and second optical-element 24 have a cubic volumetric gradient refractive-index profile wherein the z-axis integrated nanocomposite-ink profile through both the first optical-element and the second optical element has at least an approximate parabolic refractive-index profile. The parabolic refractive-index profile changes as a function of linear translation between first optic 14 and second optic 24. In some embodiments the parabolic profile has a symmetric change as a function of translation in the x-axis. Such embodiments have a cubic refractive-index profile described by:

$$\int C(x,y,z)dz = A_x x^3 + A_{xy} yx^2 + Bx^2 + Cxy + Dy^2 + Ex + Fy + G,$$

where A, B, C, D, E, and F are constants that can be optimized to obtain a desired profile. The cubic concentration profile of the first optical element has a cubic term that is the opposite in sign of the second optical-element such that the cubic term is eliminated in summation of each of the cubic concentration profiles and the summed concentration profile has a parabolic term $-2A\delta(x^2+y^2)$, where offset $\delta$ is the linear offset from the optical-axis of each the optical-element. In other embodiments the parabolic refractive-index profile has a cylindrical power change when translated in the x-axis or the y-axis. Such embodiments have a cubic concentration profile described by:

$$\int C(x,y,z)dz = N_O(1-(A_x x^3 + A_y y^3 + Bx^2 + Cxy + Dy^2 + Ex + Ey)), \text{ here}$$

both cubic terms are eliminated in summation. Equal spatial translation in both the x-axis and y-axis causes a symmetric power change.

The focal length of the variable power optic is inversely proportional to the offset and thickness of the optical-elements although the thickness of the optical-elements and spatial separation between the two optical-elements must remain sufficiently thin such that the thin lens approximation remains accurate. For planar optics with approximately the same magnitude coefficients, thickness and offset of zero, the focal length is infinite and therefore the optic has zero power. For a positive offset, the power increases, for a negative offset power decreases.

Figure 2A:
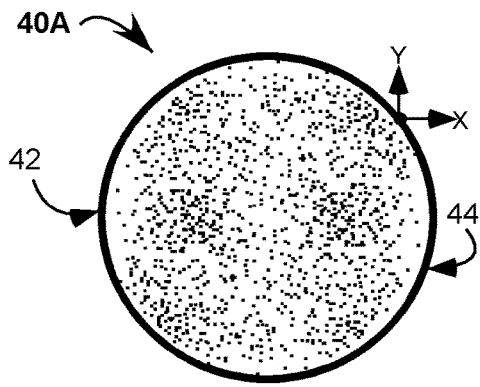
FIG. 2A is a plan view of the variable focus optic as shown in FIG. 1A and FIG. 1B illustrating a neutral alignment position with an offset of zero.
Figure 2B:
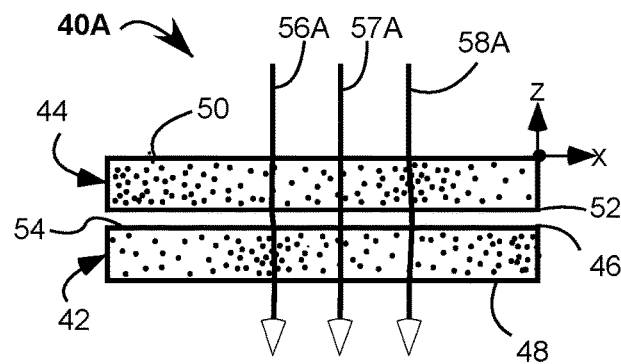
FIG. 2B is a cross-section view of the neutrally aligned variable focus optic as shown in FIG. 2A, further illustrating optical ray propagation.

Referring to FIG. 2A and FIG. 2B, a neutrally aligned variable power optic 40A with a first optical-element 42 and a second optical-element 44. First optical-element 42 has a first surface 46 and a second surface 48 with a cubic volumetric nanoparticle gradient refractive profile. Second-optical element 44 has a first surface 50 and a second surface 52 with a cubic volumetric nanoparticle gradient refractive profile. First optical-element 42 is aligned in tandem with second optical element 44, here with no orthogonal offset. As aligned the concentration of nanoparticles as integrated along the z-axis through both the first optical-element and the second optical element is constant exemplified by the uniform concentration as illustrated in FIG. 2A.

An on-axis ray 57A, a marginal ray 56A, and a marginal ray 58A propagate in parallel to neutrally aligned optical-elements 42 and 44. The rays enter at an orthogonal angle to first surface 50, continuously refract through first optical-element 42 exit second surface 52 into an air gap 54 at an angle oblique with the optical axis. The rays refract at first surface 46 and continuously refract through first optical-element 42 such that the rays exit orthogonal to second surface 48 and parallel to the optical axis.

Figure 2C:
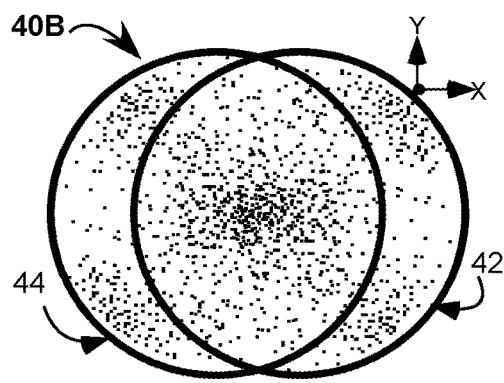
FIG. 2C is a plan view of the variable focus optic as shown in FIG. 1A and FIG. 1B illustrating a positive alignment position with a positive offset.
Figure 2D:
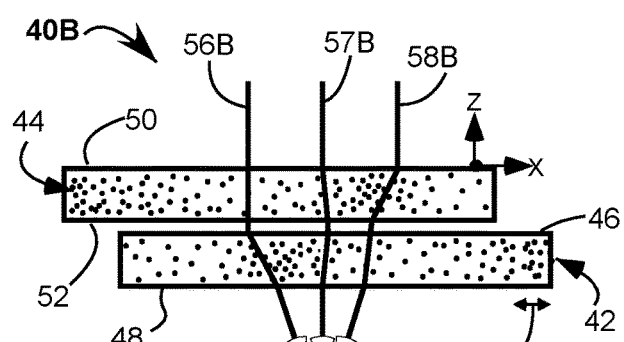
FIG. 2D is a cross-section view of the positive aligned variable focus optic as shown in FIG. 2C further illustrating optical ray propagation.

Referring to FIG. 2C and FIG. 2D a positively aligned variable power optic 40B has that shown in FIGS. 2A and 2B, except here, first optic 42 has a positive offset +δ in relation to the origin (x=0, y=0). Aligned the positive offset the concentration of nanoparticles as integrated along the z-axis through both the first optical-element and the second optical element has a positive parabolic shape exemplified by the plan view illustration shown in FIG. 2C.

An on-axis ray 57B, a marginal ray 56B, and a marginal ray 58B propagate in parallel to positively aligned optical-elements 42 and 44. As before all the optical rays enter at an orthogonal angle to first surface 50. Here, optical ray 56B refracts little though second optical element 44, exits, then refracts towards the optical-axis through first optical-element 42 towards the larger concentration of nanoparticles, and exits first second surface 48 converging towards a focal spot. On-axis ray 57B continuously refracts through second optical-element 50 in the positive x-direction, refracts through first optical element 52 in the negative x-direction towards the optical axis and exits about parallel with the optical-axis, although some parallax may occur due to the asymmetry. Marginal ray 58B refracts continuously through second optical-element 44 towards the larger concentration of nanoparticles and exits second surface 52 towards first optical element 42. Marginal ray 58B refracts little through first optical element 42 and exits first surface 48 towards the focal spot.

Figure 2E:
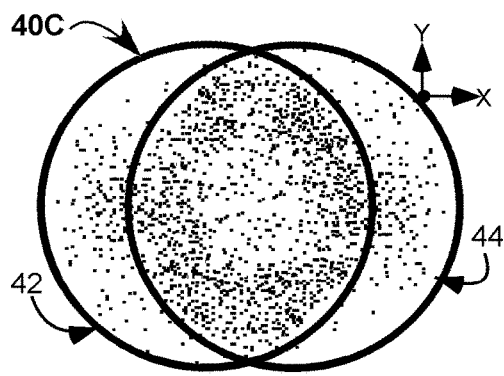
FIG. 2E is a plan view of the variable focus optic as shown in FIG. 1A and FIG. 1B illustrating a negative alignment position with a negative offset.
Figure 2F:
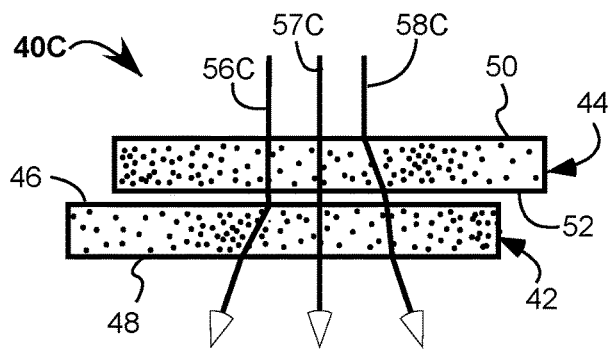
FIG. 2F is a cross-section view of the negative aligned variable focus optic shown in FIG. 2E further illustrating optical ray propagation.

Referring to FIG. 2E and FIG. 2F, a negatively aligned variable power optic 40C has that shown in FIGS. 2A and 2B, except here, first optic 42 has a negative offset +δ in relation to the origin (x=0, y=0). Aligned the negative offset the concentration of nanoparticles as integrated along the z-axis through both the first optical-element and the second optical element has a positive parabolic shape exemplified by the plan view illustration shown in FIG. 2E.

An on-axis ray 57C, a marginal ray 56C, and a marginal ray 58C propagate in parallel to positively aligned optical-elements 42 and 44. As before all the optical rays enter at an orthogonal angle to first surface 50. Here, optical ray 56C refracts little though second optical element 44, exits, then refracts away from the optical-axis through first optical-element 42 towards the larger concentration of nanoparticles, here shifted away from the optical axis. Optical ray 56C exits first second surface 48 diverging from the optical-axis. On-axis ray 57C continuously refracts through second optical-element 50 in the positive x-direction, refracts through first optical element 42 in the negative x-direction towards the optical axis and exits about parallel with the optical-axis, although some parallax may occur due to the asymmetry. Marginal ray 58C refracts continuously through second optical-element 44 towards the larger concentration of nanoparticles, here diverging from the optical-axis, and exits second surface 52 towards first optical element 42. Marginal ray 58B refracts little through first optical element 42 and exits first surface 48 diverging from the optical-axis.

Figure 3:
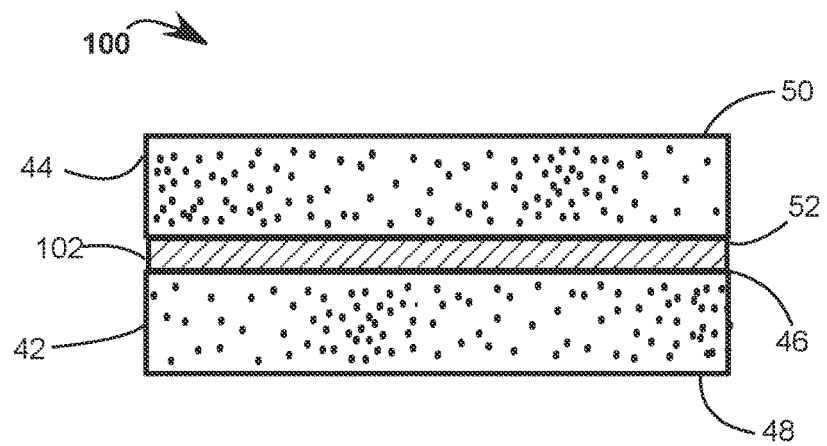
FIG. 3 is a cross-section view of the variable focus optic further comprising an intermediate layer between the first optical-element and the second optical-element.

Referring to FIG. 3, a variable focus optic 100 has that shown in FIG. 1B, further comprising a sacrificial layer 102. When printed in tandem arrangement, sacrificial layer 102 can be deposited between first optical-element 42 and second optical-element 44. The sacrificial layer facilitates cleave between the two optical-elements. Alternatively, an elastomeric layer can be deposited between the optical-elements allowing movement between the two-optical elements and reducing surface refraction at facing surfaces.

Figure 4:
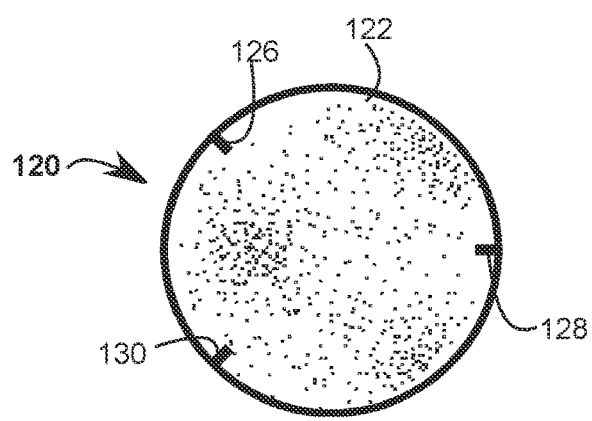
FIG. 4 is a plan view of a variable focus optic further comprising an alignment mark for rotational.

Referring to FIG. 4, an optical-element 120 has a first surface 122 with an alignment feature 126, alignment feature 128, and alignment feature 130. Here the alignment features are on first surface 122, distributed on the perimeter of optical-element 120 to facilitate rotational alignment to another optical element.

Figure 5:
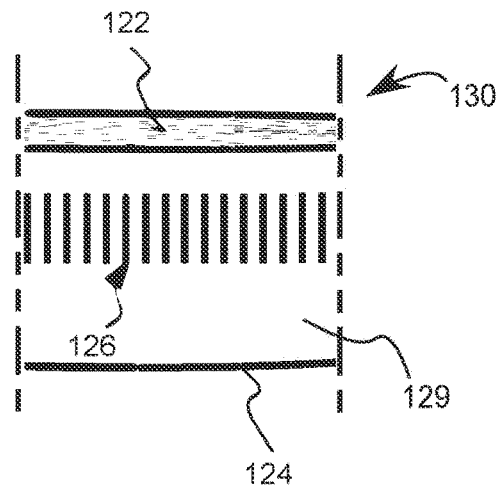
FIG. 5 is partial perspective view of the sidewall of a variable focus optic, wherein the alignment feature is scales for a linear encoder.

Referring to FIG. 5, an optical element 130 is shown with a first surface 132, a second surface 124, and alignment feature 126. Here, alignment feature 126 positioned on an outer sidewall 129 are spaced scales. Various types of scales can be deposited inducing optical, magnetic, capacitive and inductive. During the printing process the scales can be deposited on the outer sidewall to pair with a sensor thereby forming an encoder for position feedback. The variable focus optic can be paired with a linear translation stage, such as a MEMS stage, and the encoder can provide direct positional feedback.

Figure 6:
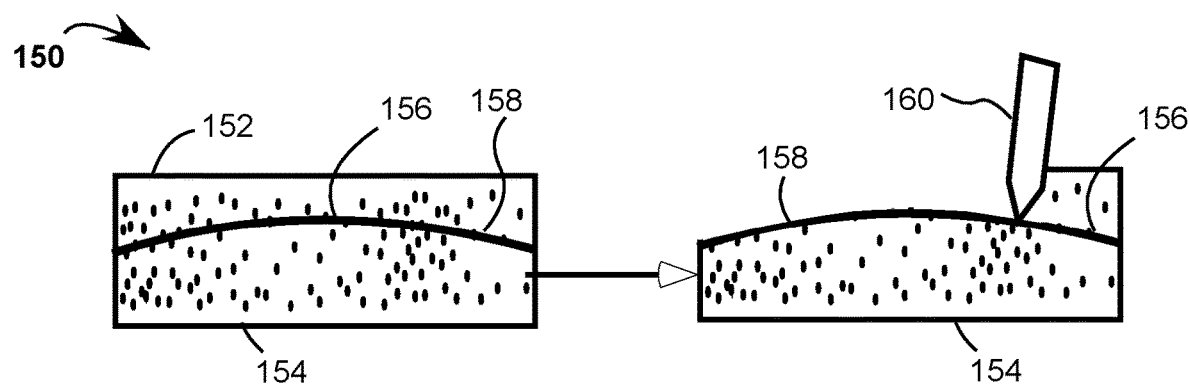
FIG. 6 is a cross-section view of a variable focus optic with an alignment mark following an aspheric contour to guide post-processing.

Referring to FIG. 6, an optical element in process 150 has a first surface 152, a second surface 154, and an alignment feature 156. Here alignment feature 156 is positioned with the volume of the optical-element along an aspheric contour 158. Alignment feature 156 provides positional feedback to inform post-process surface figuring. For instance a single-point diamond turning head 160 can either use the alignment feature to setup a CNC tool or if equipped with optical recognition can follow alignment feature 156 to form the aspheric contour 158.

Figure 7:
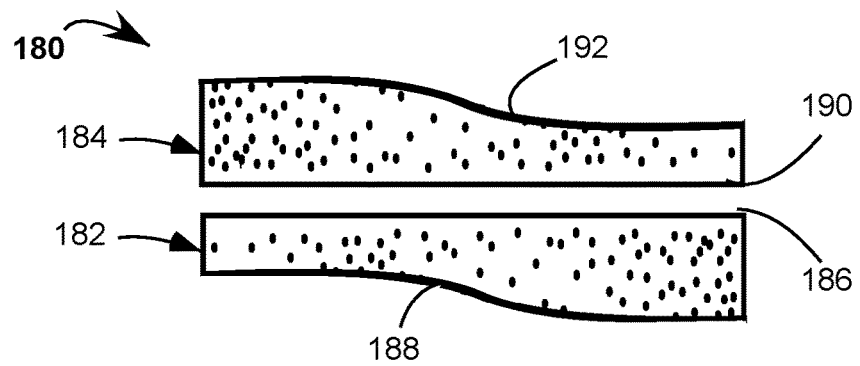
FIG. 7 is a cross-section view of a variable focus optic, wherein the first optical-element and second optical element have a cubic free form surface.

Referring to FIG. 7, an optical-element 180 has a first optical-element 182 and a second optical element 184 each with a cubic volumetric gradient refractive-index. Here, first optical-element has a first surface 186 that is planar and a second surface 188 that has a cubic contour. Second optical element 184 has a first surface 192 that has a cubic contour and a second surface 190 that is planar.

Figure 8A:
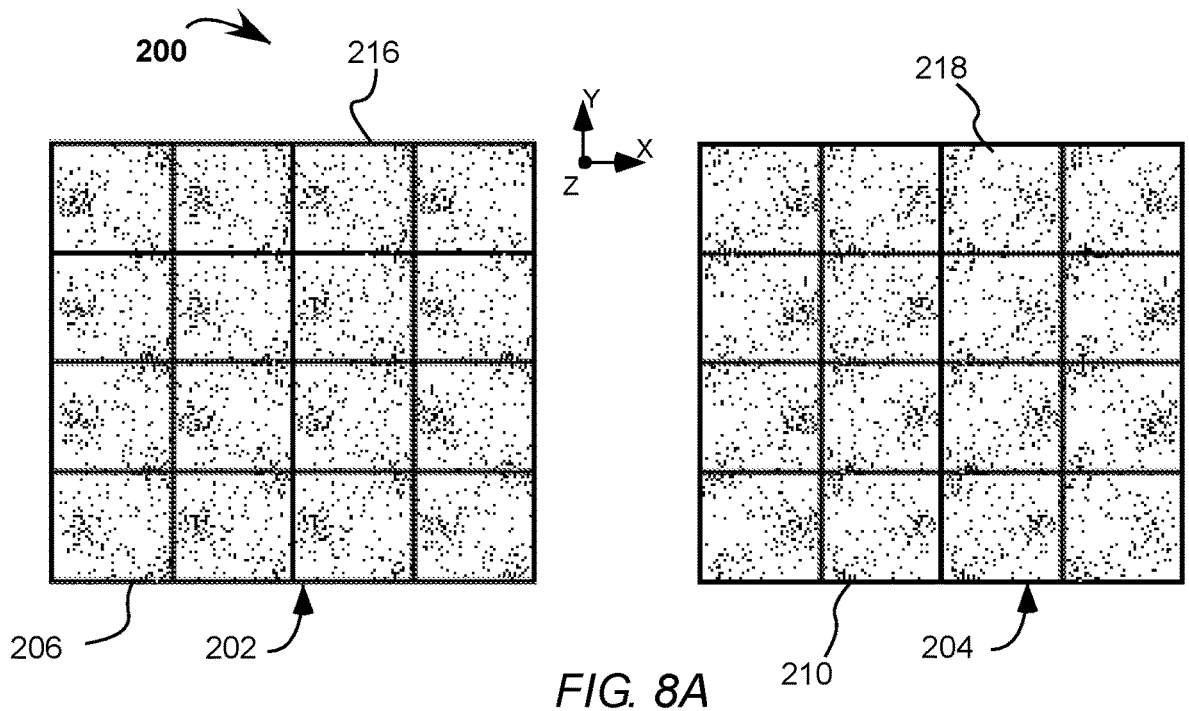
FIG. 8A is a plan view of a variable focus optic with an array of cubic volumetric refractive gradient profiles.
Figure 8B:
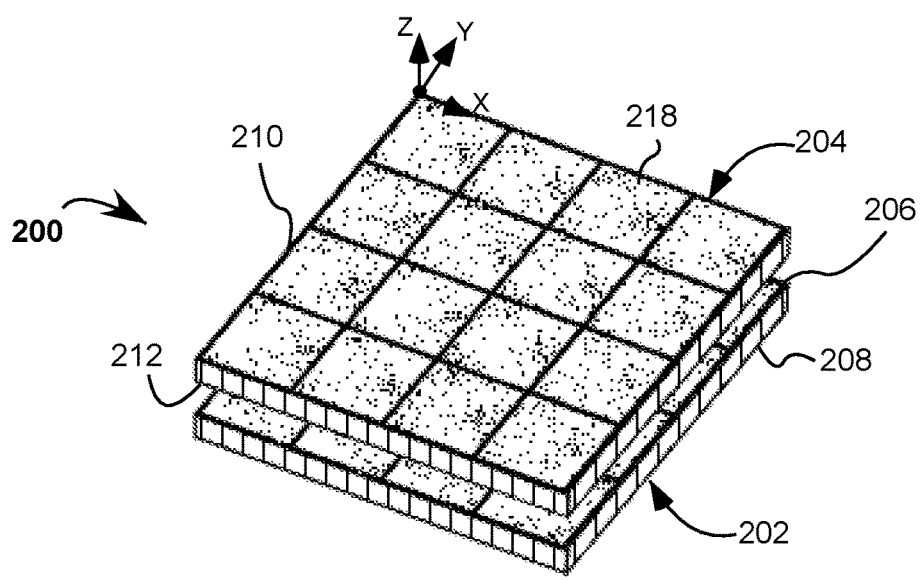
FIG. 8B is a perspective view of the variable focus optic with an array of cubic volumetric refractive gradient profiles as that shown in FIG. 8A wherein the first optical element and the second optical element are tandemly arranged.

Referring to FIG. 8A and FIG. 8B, a variable focus optic with an array of cubic volumetric refractive gradient profiles has a first optical element array 202 and a second optical element array 204. First optical element array 202 has a first surface 206 and a second surface 208 with a plurality of cubic volumetric refractive gradients between. Second optical-element array 204 has a first surface 210 and a second surface 212 with a plurality of cubic volumetric refractive gradients between. Here, the cubic volumetric refractive gradients is a four-by-four array The first optical element's cubic volumetric refractive gradients are paired with the second optical element's cubic refractive gradients wherein each pair have an optical power that varies on linear translation. By way of example, an exemplary cubic volumetric refractive gradient 216 and 218 has a power when tandemly arranged such as that shown in FIG. 8B. Each of the paired volumetric refractive gradients can have the same power or the power can vary across the array.

Here, each of the cubic volumetric refractive gradients have a square optical shape to increase the fill factor. In other embodiments the optical aperture can be circular. Carbon, metal, or other opaque inks can be used to separate isolate each of the paired cubic volumetric refractive gradients to reduce or eliminate crosstalk during linear translation. As aforementioned, the area between the first optical-element and second optical element filled and surfaces can shaped.

From the description provided herein one skilled in the art can manufacture the apparatus and practice the methods disclosed in accordance with the present disclosure. In summary, while the present invention has been described in terms of particular embodiments and examples, others can be implemented without departing in scope. The invention is not limited to the embodiments described and depicted herein. Rather, the invention is limited only by the claims appended hereto.

What is claimed is:

1. A gradient refractive-index optic with variable focus, comprising:
   a first optical element including a cured coalescence of a first plurality of nanocomposite-ink droplets of different compositions, which provide a first cubic volumetric refractive-index gradient;
   a second optical element including a cured coalescence of a second plurality of nanocomposite-ink droplets of different compositions, which provide a second cubic volumetric refractive-index gradient;
   wherein the first and second optical elements each comprise an alignment feature, are arranged in tandem along an optical axis, and have a combined optical power that varies based on linear translation between the first optical element and the second optical element orthogonal to the optical axis.

2. The optic of claim 1, wherein each of the first and second optical elements has at least one planar surface.

3. The optic of claim 1, wherein the first and the second optical elements are formed using a nanocomposite-ink having a same organic-matrix material.

4. The optic of claim 1, further comprising a means of translating the first optic, the second optic, or combinations thereof.

5. The optic of claim 4, wherein the means of translating includes a manual mechanism and/or a motorized mechanism.

6. The optic of claim 4, wherein the means of translation includes a microelectromechanical system.

7. The optic of claim 1, wherein the first and the second optical elements comprise different nanoparticle materials.

8. The optic of claim 1, further comprising an intermediate elastomeric layer arranged between the first and the second optical elements.

9. The optic of claim 8, wherein the intermediate elastomeric layer has a gradient refractive index.

10. The optic of claim 8, wherein the intermediate elastomeric layer is configured to correct chromatic aberration by the optic.

11. The optic of claim 1, further comprising an intermediate sacrificial layer arranged between the first and second optical elements.

* * * * *